United States Patent
Price (10) Patent No.: US 11,200,147 B2
(45) Date of Patent: Dec. 14, 2021

(54) ARCHITECTURE AGNOSTIC REPLAY VERFICATION

(71) Applicant: Raytheon Company, Waltham, MA (US)

(72) Inventor: Gregory Price, Silver Spring, MD (US)

(73) Assignee: Raytheon Company, Waltham, MA (US)

( * ) Notice: Subject to any disclaimer, the term of this patent is extended or adjusted under 35 U.S.C. 154(b) by 38 days.

(21) Appl. No.: 16/720,554

(22) Filed: Dec. 19, 2019

(65) Prior Publication Data
US 2021/0191841 A1 Jun. 24, 2021

(51) Int. Cl.
*G06F 11/36* (2006.01)

(52) U.S. Cl.
CPC ........ *G06F 11/3636* (2013.01); *G06F 11/366* (2013.01); *G06F 11/3644* (2013.01); *G06F 11/3656* (2013.01); *G06F 11/3664* (2013.01)

(58) Field of Classification Search
CPC ............. G06F 11/3636; G06F 11/3644; G06F 11/3656; G06F 11/366; G06F 11/3664
USPC ........................................................ 717/128
See application file for complete search history.

(56) References Cited

U.S. PATENT DOCUMENTS

| 2009/0119493 | A1 | 5/2009 | Venkitachalam et al. |
| 2009/0320011 | A1* | 12/2009 | Chow et al. ........ G06F 11/3636 717/154 |
| 2018/0004526 | A1* | 1/2018 | Lyra .................... G06F 11/3636 |

OTHER PUBLICATIONS

PCT International Search Report and Written Opinion dated Apr. 7, 2021 for International Application No. PCT/US2020/062810; 18 Pages.
Sharma, et al., "Low Overhead Hardware-Assisted Virtual Machine Analysis and Profiling;" 2016 IEEE Globecom Workshops (GC Wkshps); Dec. 4, 2016; 6 Pages.
Yagemann, et al., "Barnum: Detecting Document Malware via Control Flow Anomalies in Hardware Traces;" International Conference on Information Security; Sep. 2, 2019; 19 Pages.
Sharma, et al., "Hardware-Assisted Instruction Profiling and Latency Detection;" The Journal of Engineering; Aug. 30, 2016; 23 Pages.

* cited by examiner

*Primary Examiner* — Wei Y Zhen
*Assistant Examiner* — Mohammed N Huda
(74) *Attorney, Agent, or Firm* — Daly, Crowley, Mofford & Durkee, LLP (57) ABSTRACT

According to aspects of the disclosure a method is provided, comprising: generating a live execution trace log corresponding to a live execution of a computer program, the live execution being performed by using both hardware emulation and hardware acceleration; generating a first trace entry corresponding to a replay execution of the computer program, the replay execution being performed by using hardware emulation without hardware acceleration, the replay execution being performed based on a set of events that are recorded during the live execution of the computer program; detecting whether the first trace entry is valid based on the live execution trace log; and in response to detecting that the first trace entry is not valid, transitioning into a safe state.

18 Claims, 6 Drawing Sheets

TNT – TAKEN-NOT-TAKEN
TIP – TARGET INSTRUCTION POINTER
FUP – FLOW UPDATE POINTER

ARCHITECTURE AGNOSTIC REPLAY VERFICATION

BACKGROUND

Program replay/record is an effective technique for debugging of software. When program record/replay is used, a live execution of the computer program is recorded to produce a trace log identifying one or more branches that were taken during the live execution. The live execution of the program then is repeated in what is herein referred to as "replay execution," by using the same set of events and/or inputs were used as a basis for the live execution. As a result of the replay execution, a second trace log is generated, which is herein referred to as "replay execution trace log." The replay execution trace log may be used to identify defects in the software that is being debugged.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure a method is provided, comprising: generating a live execution trace log corresponding to a live execution of a computer program, the live execution being performed by using both hardware emulation and hardware acceleration; generating a first trace entry corresponding to a replay execution of the computer program, the replay execution being performed by using hardware emulation without hardware acceleration, the replay execution being performed based on a set of events that are recorded during the live execution of the computer program; detecting whether the first trace entry is valid based on the live execution trace log; and in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

According to aspects of the disclosure, a system is provided, comprising: a memory; and at least one processor, configured to perform the operations of: generating a live execution trace log corresponding to a live execution of a computer program, the live execution being performed by using both hardware emulation and hardware acceleration; generating a first trace entry corresponding to a replay execution of the computer program, the replay execution being performed by using hardware emulation without hardware acceleration, the replay execution being performed based on a set of events that are recorded during the live execution of the computer program; detecting whether the first trace entry is valid based on the live execution trace log; and in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

According to aspects of the disclosure, a non-transitory computer-readable medium that stores processor executable instructions, which when executed by at least one processor cause the at least one processor to perform the operations of: generating a live execution trace log corresponding to a live execution of a computer program, the live execution being performed by using both hardware emulation and hardware acceleration; generating a first trace entry corresponding to a replay execution of the computer program, the replay execution being performed by using hardware emulation without hardware acceleration, the replay execution being performed based on a set of events that are recorded during the live execution of the computer program; detecting whether the first trace entry is valid based on the live execution trace log; and in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

As used throughout the disclosure, the term "branch" shall refer to any instruction that causes a computer program to begin executing a different instruction sequence. Examples of branches include a jump instruction (e.g., JMP), a conditional jump (e.g., CJMP), an interrupt, etc. According to the present disclosure, a branch in a computer program may be considered to be "taken" when the address of the next instruction of the computing program, which is executed immediately after the branch, is calculated by an instruction or event. For example, in some architectures, a conditional branch (e.g., a conditional jump) is taken only when a precondition associated with the conditional branch evaluates to TRUE. By contrast, an unconditional branch (e.g., the x86 CALL procedure) is always considered to be taken, when the unconditional branch is executed. In some respects, a conditional branch would be considered a "Taken Branch" if a condition associated with the branch is true, and a "Not Taken Branch" if the condition is false.

Figure 1A:
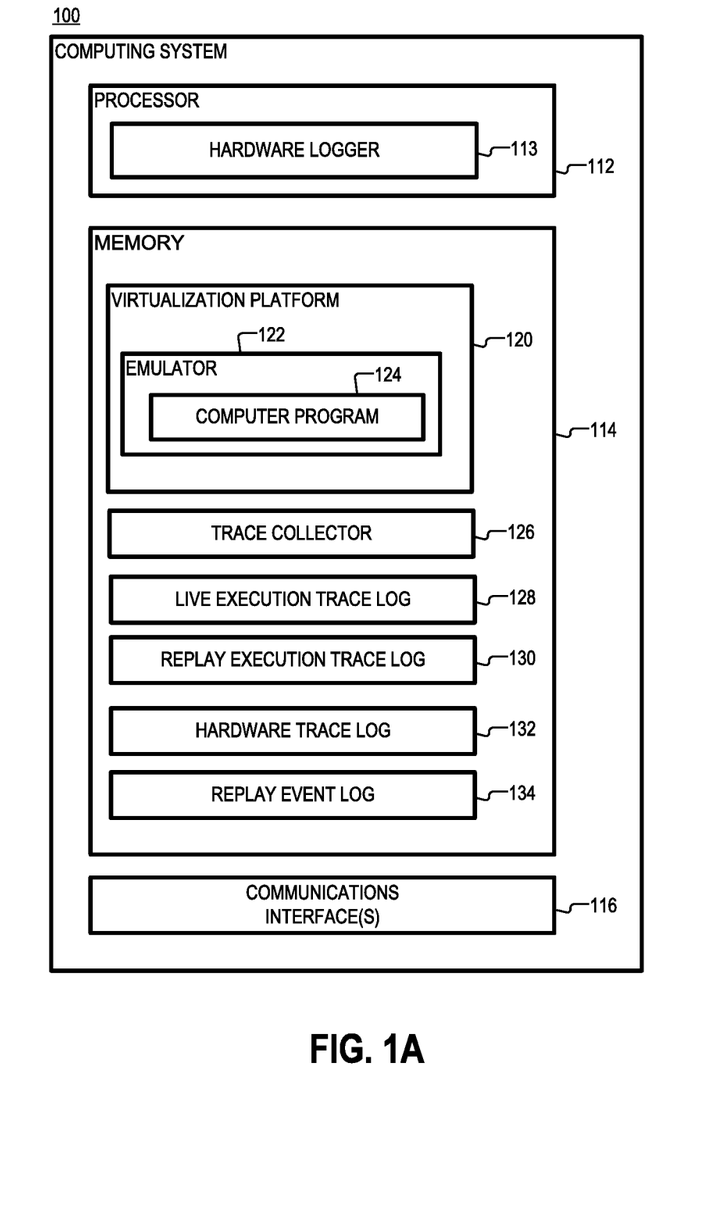
FIG. 1A is a diagram of an example of a computing system, according to aspects of the disclosure.

FIG. 1 is a schematic diagram of a computing system 100, according to aspects of the disclosure. As illustrated, the computing system 100 may include at least one processor 112 that is operatively coupled to a memory 114, and communications interface(s) 116. The processor 112 may include any suitable type of processing circuitry, such as one or more of an integrated circuit (ASIC), a field-programmable gate array (FPGA), and/or a general-purpose processor (e.g., an ARM-based processor, etc.). The memory 114 may include any suitable type of volatile and/or non-volatile memory. For example, in some implementations, the memory 114 may include one or more of random-access memory (RAM), a read-only memory (ROM), a solid-state drive (SSD), electrically erasable programmable read-only memory (EEPROM), and/or any other suitable type of memory. The communications interface(s) 116 may include a Bluetooth interface, a WiFi interface, a ZigBee interface, a Universal Serial Bus (USB) interface, and/or any other suitable type of interface.

The processor 112 may include a hardware logger 113. The hardware logger 113 may be implemented by using dedicated hardware facilities of the processor 112 (e.g., logic gates that are part of the processor 112 and/or microcode that is provided within the processor 112). In some implementations, the hardware logger 113 may be the same or similar to the Intel™ Processor Trace logger, which is produced and marketed by Intel Corporation of Santa Clara, Calif., USA. In operation, the hardware logger 113 may capture information about the execution of the computer program 124 by using dedicated hardware facilities and store the information in a hardware trace log 132.

The processor 112 may be configured to execute a virtualization platform 120, including an emulator 122. The emulator 122 may include one or more of a full-system emulator, a virtual machine, and/or any other suitable type of emulator that is configured to emulate the instruction set of the processor 112. The emulator 122 may be configured to execute a computer program 124. The processor 112 may be configured to execute a trace collector 126, which is arranged to generate a live execution trace log 128 and a replay execution trace log 130. The trace collector 126 may be implemented in software, in hardware, or as a combination of software and hardware.

The live execution trace log 128 may include one or more files (or data structures) that identify the program flow of the computer program 124 during a live execution of the computer program 124. In some implementations, the live execution trace log 128 may identify one on or more branches that are part of the computer program 124. Additionally, or alternatively, for each of the identified branches, the live execution trace log 128 may indicate whether the branch was taken, and the target address to which the live execution of the computer program 124 was redirected as a result of the branch. As noted above, in some implementations, some of the entries in the live execution trace log 128 may be generated and added to the live execution trace log 128 by the trace collector 126, whereas other entries in the live execution trace log may be generated by the hardware logger 113 and added to the live execution trace log 128 by the trace collector 126.

The replay execution trace log 130 may include one or more files (or data structures) that identify the program flow of the computer program 124 during a replay of the live execution of the computer program 124 (hereinafter "replay execution of the computer program 124"). In some implementations, the live execution trace log 128 may identify one on or more branches that are part of the computer program 124. Additionally, or alternatively, for each of the identified branches, the live execution trace log may indicate whether the branch was taken, and the target address to which the replay execution of the computer program 124 was redirected as a result of the branch being taken. In some implementations, unlike the live execution trace log 128, all entries in the replay execution trace log 130 may be generated and added to the live execution trace log by the trace collector 126.

The hardware trace log 132 may include a location in the memory 114 where the hardware logger 113 stores trace entries that are generated by the hardware logger 113. In some implementations, these trace entries may identify one or more of more branches that are part of the computer program 124, whether any of the branches is taken, and the target address to which the live execution of the computer program 124 was redirected as a result of the branch being taken. It will be understood that the present disclosure is not limited to any specific implementation and/or format of the hardware trace log 132.

The replay event log 134 may identify one or more non-deterministic events that are generated within the computing system 100 during the live execution of the computer program 124. The non-deterministic events may include events that are generated when a particular mouse input is provided to the computing system 100 (e.g., a mouse click, a mouse scroll etc.). Additionally, or alternatively, the non-deterministic events may include events that are generated when a particular keyboard input is provided to the computing system 100 (e.g., button press events, etc.) Additionally, or alternatively, the non-deterministic events identified in the replay event log 134 may include events that are generated when a timer in the processor 112 expires, etc. Additionally, or alternatively, the non-deterministic events identified in the replay event log 134 may include events that are generated when data is received at a communications interface of the computing system 100, etc. It will be understood that the present disclosure is not limited to any specific type of event being identified in the event replay event log 134.

The replay event log 134 may be used as a basis for the replay execution of the computer program 124. In this regard, during the replay execution of the computer program 124, events identified in the replay event log 134 may be fed to the computer program in an attempt to repeat the live execution of the computer program 124 under the same circumstances that occurred during the live execution of the computer program 124. The live execution of the computer program 124 can be replayed for the purpose of debugging the computer program 124. Replay is an important technique in program analysis, allowing to reproduce bugs, to track changes, and to repeat execution of the computer program 124 for better understanding of the computer program.

Figure 1B:
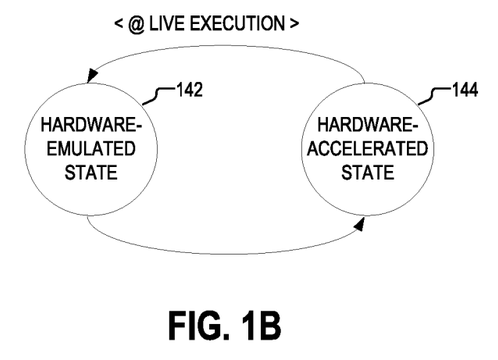
FIG. 1B is a state chart associated with a live execution of a computer program, according to aspects of the disclosure.
Figure 1C:
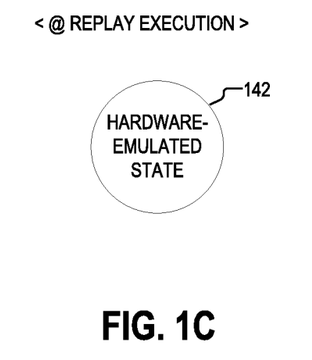
FIG. 1C is a state chart associated with a replay execution of a computer program, according to aspects of the disclosure

FIGS. 1B-C illustrate the difference between live execution and replay execution of the computer program. Shown in FIG. 1B is a state diagram illustrating that during live execution, the computer program 124 may cycle between a hardware-emulation state 142 and a hardware-accelerated state 144. Shown in FIG. 1C is a state diagram illustrating that during replay execution, the computer program 124 may remain in the hardware-emulation state 142 for the entire duration of the replay execution. In other words, during replay execution, hardware acceleration is disabled, while during live execution hardware acceleration is actively used to execute the computer program 124.

When the computer program 124 is in the hardware-emulated state, processor-level instructions that are part of the computer program 124 are provided to various emulation routines in the emulator 122, which implement the instructions. By contrast, when the computer program 124 is in the hardware-accelerated state, processor-level instructions are provided directly to the processor 112 (i.e., without the involvement of emulation routines). In some implementations, when the computer program 124 is in the hardware-accelerated state, processor-level instructions may be provided to the processor by using a virtual machine extension (VMX). The virtual machine extension may be part of the virtualization platform 120, and it may be configured to expose the processor 112 to software that is being executed on the emulator 122.

Figure 2:
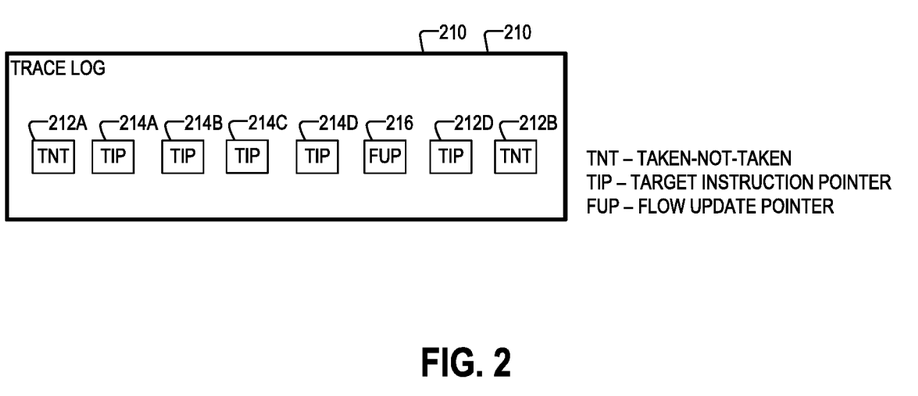
FIG. 2 is a diagram of an example of a trace log, according to aspects of the disclosure.

FIG. 2 shows an example of a trace log 210, according to aspects of the disclosure. The trace log 210 may be the same or similar to any of the live execution trace log 128, the replay execution trace log 130, and/or the hardware trace log 132. The trace log 210 may include one or more taken-not-taken (TNT) entries 212, one or more target instruction pointer (TIP) entries 214, and one or more flow update pointer (FUP) entries 216. Any of the TNT entries may include a bit string, wherein each bit in the bit is associated with a different branch. The value of each bit indicates whether the bit's respective branch is taken or not taken. For instance, if a bit in the TIP entry 214 is equal to '0' that would indicate that the branch corresponding to the bit is not taken. On the other hand, if the bit is equal to '1', this would indicate that the branch is taken. Each of the TIP entries 214 may correspond to a different one of the branches identified in a TNT entry 212 that precedes the TIP entry 214. Furthermore, each of the TIP entries 214 may identify the target address to of the instruction (in the computer program 124), which is executed immediately after the TIP entry's 214 respective branch. For instance, TIP entry 214A may identify the address of the instruction that is executed immediately after a first one of the branches identified in TNT entry 212A; TIP entry 214B may identify the address of the instruction that is executed immediately after a second one of the branches identified in TNT entry 212A; TIP entry 214C may identify the address of the instruction that is executed immediately after a third one of the branches identified in TNT entry 212A; and TIP entry 214D may identify the address of the instruction that is executed immediately after a fourth one of the branches identified in TNT entry 212A. Each of the FUP entries 216 in the trace log 210 may identify the address of the instruction that was executing at the time of a non-deterministic event occurring (such as an interrupt). In this regard, each of the FUP entries 216 provides the "From" address, while any TIP entry 212 immediately 212 following the FUP entry 216 identifies the "To" address of the instruction that is executed following the generation of the non-deterministic event (which corresponds to the FUP entry).

Figure 3:
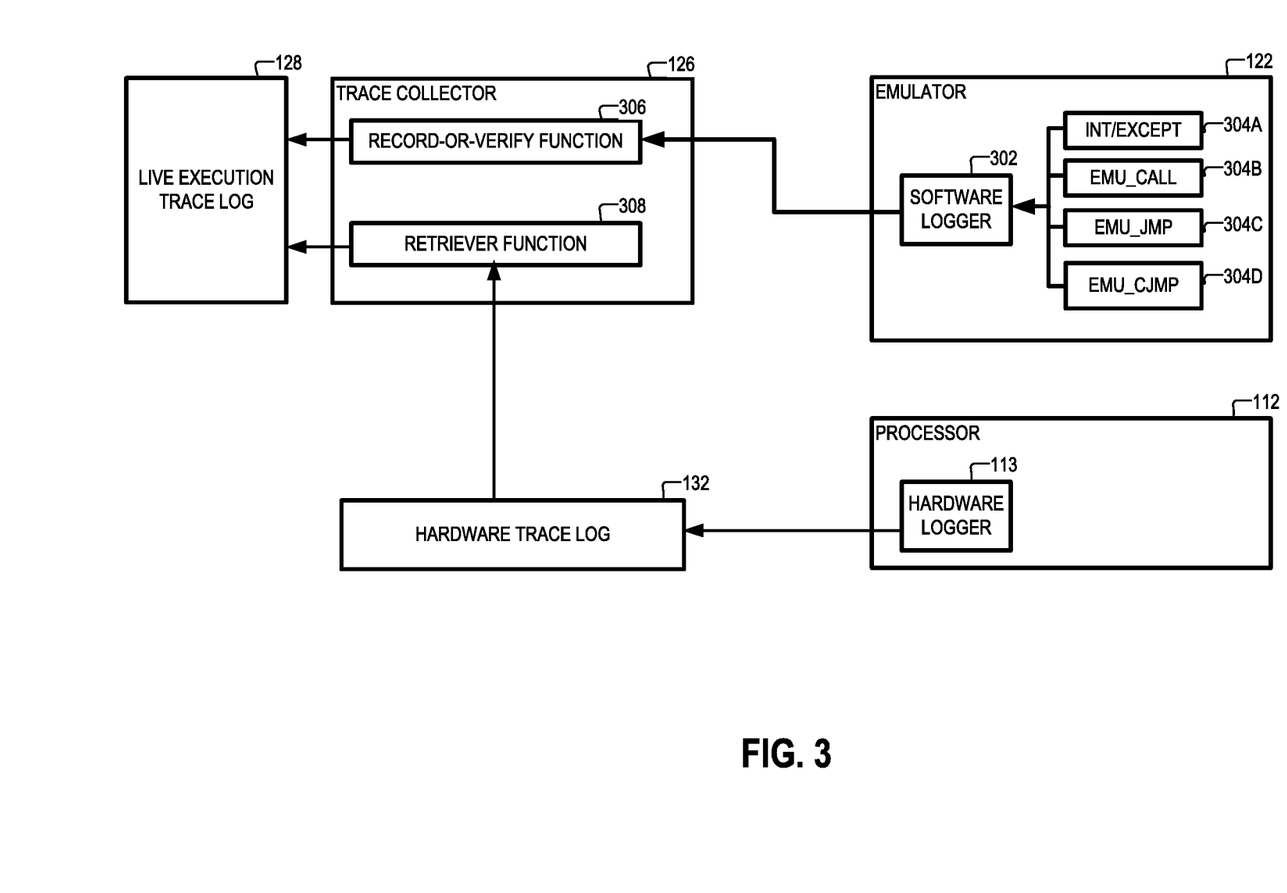
FIG. 3 is a diagram is a schematic diagram illustrating a process for generating live execution trace logs, according to aspects of the disclosure.

FIG. 3 is a schematic diagram illustrating a process for generating the live execution trace log 128, according to aspects of the disclosure.

According to the example of FIG. 3, the emulator 122 may include a software logger 302 and a plurality of emulation routines 304 that correspond to different branch instructions. According to the present example, the emulation routine 304A is called when an interrupt or exception (related to the execution of the computer program 124) is generated in the computing system 100; the routine 304B is called when a CALL instruction that is part of the computer program 124 is executed by the emulator 122; the routine 304C is called when a JMP (i.e., jump) instruction that is part of the computer program 124 is executed by the emulator 122; and the routine 304D is called when a CJMP (i.e., conditional jump) instruction that is part of the computer program 124 is executed by the emulator 122.

According to the example of FIG. 3, the trace collector 126 may include a record-or-verify function 306 and a retriever function 308. The function 306 may include one or more processor executable instructions that are arranged to generate new trace log entries in response to respective requests from the software logger 302 and add the generate trace log entries to the live execution trace log 128. The retriever function 308 may include one or more processor-executable instructions that are generated to retrieve trace log entries that part of the hardware trace log 132 and append the retrieved entries to the live execution trace log 128. In some implementations, the function 306 may be configured to perform any of the processes 400A and 500, which are discussed further below with respect to FIGS. 4A and 5, respectively. Additionally, or alternatively, in some implementations, the retriever function 308 may be configured to execute the process 400B, which is discussed further below with respect to FIG. 4B.

As noted above, each of the emulation routines 304 may be called when an instruction (that is part of the computer program 124) is desired to be executed by the emulator 122. For example, when a live execution flow of the computer program 124 reaches a CALL instruction, while the computer program 124 is in the hardware-emulated state 142, the routine 304B may be called. When the live execution flow of the computer program 124 reaches a JMP instruction, while the computer program 124 is in the hardware-emulated state 142, the routine 304C may be called. When the live execution flow of the computer program 124 reaches a JMP instruction, while the computer program 124 is in the hardware-emulated state 142, the routine 304D may be called. Similarly, when a non-deterministic event is generated within the computing system 100, the emulation routine 304A may be called.

In operation, when any of the emulation routines 304 is called, the emulation routine 304 may submit a notification to the software logger 302 (e.g., by calling an API of the software logger, etc.). The notification may identify one or more of (i) the emulation routine 304 from which the notification originates, (ii) the type of branch instruction that is associated with the routine, (iii) the address (in the computer program 124) of the branch instruction which the route is called to execute, (iv) an indication of whether the branch is taken, (v) and a target address to which the live execution of the computer program 124 was redirected as a result of the branch being taken.

When the software logger 302 receives a notification that a given one of the routines 304A-D is called, the software logger 302 may transmit, to the record-or-verify function 306, a request to add one or more new trace entries to the live execution trace log 128. The request may be generated based on any of the information that is provided with the notification. In some implementations, the request may identify one or more of (i) the type of branch instruction that is associated with the routine, (ii) the address (in the computer program 124) of the branch instruction which the route is called to execute, (iii) an indication of whether the branch is taken, and (iv) a target address to which the live execution of the computer program 124 was redirected as a result of the branch being taken.

When the record-or-verify function 306 receives a request to generate one or more new trace entries, the record-or-verify function 306 may generate the one or more new trace entries in response to the request. In some implementations, the generated trace entries may be the same or similar to one or more of the trace entries 212, 214, and 216 which are discussed above with respect to FIG. 2A. After the new trace entries are generated, the new trace entries may be added to the live execution trace log 128. Adding the new trace entries to the live execution trace log 128 may include appending the new trace entries to the live execution trace log.

When a collection event is detected, the retriever function 308 may retrieve one or more trace entries that are stored in the hardware trace log 132 and add the retrieved trace entries to the live execution trace log 128. Adding the new trace entries to the live execution trace log 128 may include appending the new trace entries at the end of the live execution trace log. In some implementations, the collection event may include an event that is generated within the computing system 100 when a timer expires (e.g., a timeout event) or an event that is generated within the computing system 100 when the computer program 124 transitions from the hardware-accelerated state 144 to the hardware-emulated state 142.

According to aspects of the disclosure, the record-or-verify function 306 may be executed (and/or called) when the computer program 124 is in the hardware-emulated state 142. By contrast, the retriever function 308 may be executed (and/or called) when the computer program 124 is in the hardware-accelerated state 144. In some implementations, the record-or-verify function 306 and the retriever function 308 may not be executed concurrently. For instance, in some implementations, the retriever function 308 may be executed during a period in which the computer program 124 is in the hardware-accelerated state 144 and immediately before (or after) the computer program 124 transitions into the hardware-emulated state 142 (to collect the last trace entries that are stored into the hardware trace log 132 prior to the computer program transitioning into the hardware-emulated state 142), but it may not be executed afterwards, for the rest of the period in which the computer program 124 remains in the hardware-emulated state.

According to aspects of the disclosure, the trace collector 126 may be arranged to detect state transition events. A state transition event may include any event that is generated within the computing system 100, which indicates: (i) a transition of the computer program 124 from the hardware-emulated state 142 to the hardware-accelerated state 144, or (ii) a transition of the computer program 124 from the hardware-accelerated state 144 to the hardware-emulated state 142. For example, in some implementations, the emulator 122 (or virtualization platform 120) may be arranged to generate state transition events when a VMX or another facility of the emulator (or virtualization platform 120) that exposes the processor 112 directly to the computer program 124 is activated. As another example, the computer program 124 may be configured to generate the state transition events. It will be understood that the present disclosure is not limited to any specific method for detecting transitions of the computer program 124 between the hardware-emulated state 142 and the hardware-accelerated state 144.

According to aspects of the disclosure, the trace collector 126 may be configured to execute the retriever function 308 in response to state transition events that indicate that the computer program 124 has transitioned form the hardware-emulation state 142 to the hardware-acceleration state 144. Similarly, the trace collector 126 may be configured to terminate the execution of the retriever function 308 in response to state transition events that indicate that the computer program 124 has transitioned form the hardware-accelerated state 144 to the hardware-emulated state 142.

According to aspects of the disclosure, the record-or-verify function 306 may be configured to retrieve, from the hardware trace log 132, only trace entries corresponding to instructions in the computer program 124 that are executed while the computer program 124 is in the hardware-accelerated state 144. In this regard, the trace collector 126 may be configured to delete, from the hardware trace log, trace entries corresponding to instructions that are executed while the computer program 124 is executed in hardware-emulated mode. As can be readily appreciated, deleting such trace entries may prevent the retriever function 308 from retrieving and adding the trace entries to the live execution trace log 128. Although in the present example trace entries that are generated while the computer program 124 is in the hardware-emulated state 142 are deleted, it will be understood that the present disclosure is not limited to any specific method for separating trace entries generated (by the hardware logger 113) while the computer program is in the hardware-emulation state 142 from trace entries generated (by the hardware logger 113) while the computer program is in the hardware-acceleration state 144.

Figure 4A:
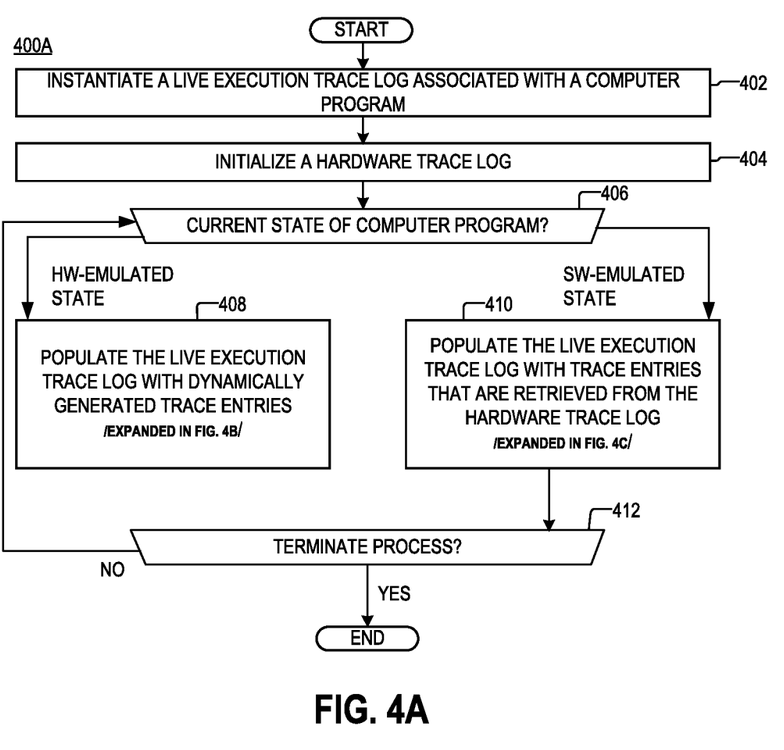
FIG. 4A is a flowchart of an example of a process, according to aspects of the disclosure.

FIG. 4A is a flowchart of an example of a process 400A for generating a live execution trace log for a computer program, according to aspects of the disclosure. According to the present example, the process 400A is performed by a trace collector, such as the trace collector 126, which is discussed above with respect to FIG. 3. However, it will be understood that alternative implementations are possible in which the process 400A is performed by another software (or hardware) component of a computing system. Furthermore, it will be understood that at least some of the steps of the process 400A may be performed in a different order or altogether omitted. According to the present example, the process 400A is executed during a live execution of the computer program. The computer program may be the same or similar to the computer program 124, which is discussed above with respect to FIGS. 1A-3.

At step 402, the trace collector instantiates a live execution trace log that is associated with the computer program. Instantiating the live execution trace log may include instantiating or more files (or other structures) that are configured to store trace data that is generated during a live execution of the computer program. The live execution log may be the same or similar to the live execution trace log 128, which is discussed above with respect to FIGS. 1A-3.

At step 404, the trace collector initializes a hardware trace log. In some implementations, initializing the hardware trace log may include executing a handshake with a hardware logger, which, when completed, causes the hardware logger to begin storing trace entries at a given memory location. The hardware trace log may be the same or similar to the hardware trace log 132, which is discussed above with respect to FIGS. 1A-3.

At step 406, the trace collector determines the current state of the computer program. If the computer program 124 is in a hardware-emulated state, the process 400A proceeds to step 408. Otherwise, if the computer program is in a hardware-accelerated state, the process 400A proceeds to step 410.

At step 408, the trace collector populates the live execution trace log with trace entries that are generated dynamically by the trace collector. In some implementations, step 408 may be performed in accordance with the process 400B, which is discussed further below with respect to FIG. 4B.

At step 410, the trace collector populates the live execution trace log with trace entries that are retrieved from the hardware trace log. In some implementations, step 408 may be performed in accordance with the process 400C, which is discussed further below with respect to FIG. 4C At step 412, the trace collector determines whether to terminate the process 400A. In some implementations, the trace collector may terminate the process 400A when a predetermined user input is received or when the live execution of the computer program terminates. If the trace collector determines, at step 412, that the process 400A needs to be terminated, the process 400A ends. Otherwise, the process 400A returns to step 406.

Figure 4B:
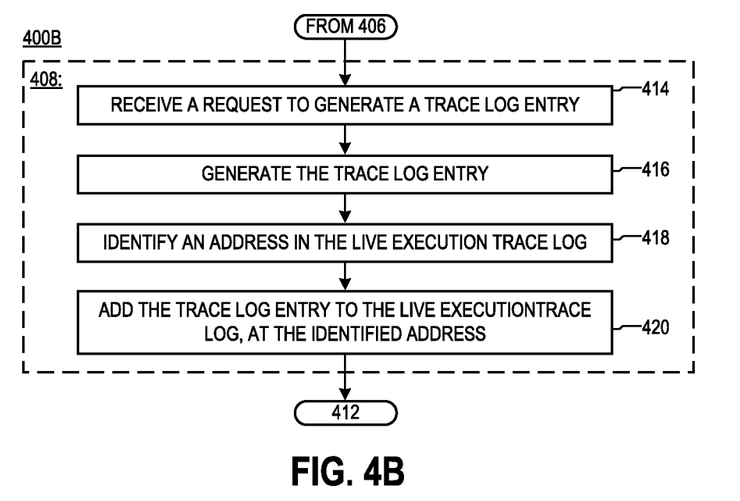
FIG. 4B is a flowchart of an example of a process, according to aspects of the disclosure.

FIG. 4B is a flowchart of an example of a process 400B for populating a live execution log with dynamically generated trace entries, as specified by step 408 of the process 400A. In some implementations, the process 400A may be performed by a record-or-verify function, such as the function 306. However, it will be understood that alternative implementations are possible in which the process 400A is performed by another software (or hardware) component of a computing system. According to the process, at step 414, a request to generate a trace log entry is received. At step 416, the trace log entry is generated. At step 418, an address in the trace log is identified. At step 420, the trace log entry is added to the trace log, at the identified address.

Figure 4C:
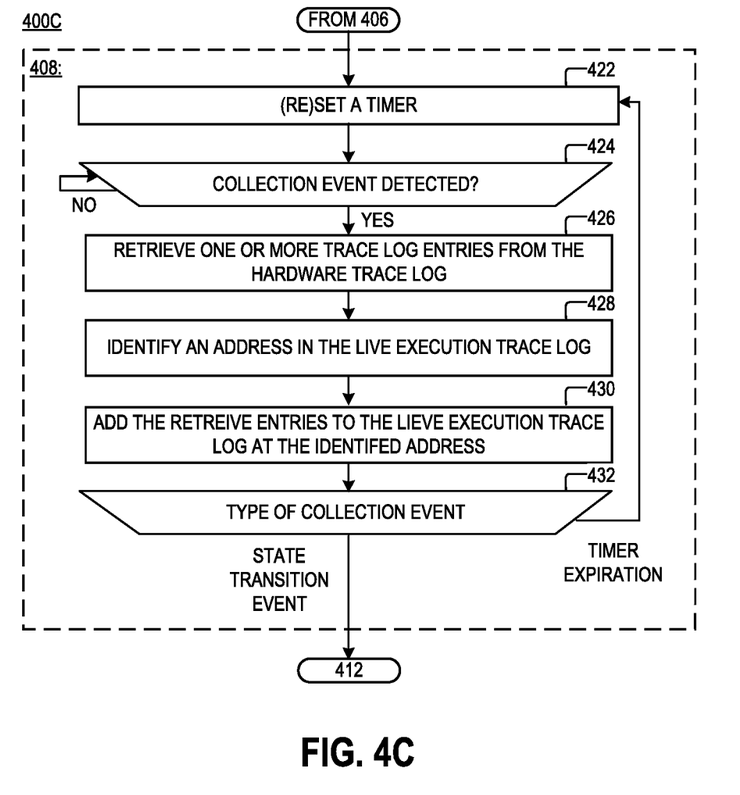
FIG. 4C is a flowchart of an example of a process, according to aspects of the disclosure.

FIG. 4C is a flowchart of an example of a process 400C for populating a live execution log with trace entries that are retrieved from a hardware trace log, as specified by step 410 of the process 400A. In some implementations, the process 400A may be performed by a retriever function, such as the function 306. However, it will be understood that alternative implementations are possible in which the process 400A is performed by another software (or hardware) component of a computing system.

At step 422, a timer is (re)set. At step 424 a determination is made whether a collection event is detected. The collection event may include one of: (i) a state transition event indicating a transition from the hardware-accelerated state to the hardware emulated state, or (ii) an event indicating the expiration of the timer (set at step 422). If a collection event is detected, the process 400C proceeds to step 426. Otherwise, step 424 is executed again.

At step 424, one or more trace entries are retrieved from a hardware trace log. The hardware trace log may be the same or similar to the hardware trace log 132, which is discussed above with respect to FIG. 1A. In some implementations, the retrieved trace entries may include one of: (i) only trace entries that have been added to the hardware trace log 132 since the last execution of step 424, or (ii) trace entries that have been added since a transition of the computer program into the hardware-accelerated state.

At step 426, an address in the trace log is identified. As used throughout the disclosure, the phrase "address in a trace log" shall refer to any indication of a location in a trace log. For example, in some implementations, the address may be an offset from the beginning of the trace log. In such implementations, step 426 may include incrementing (e.g., by one) the offset at which a trace entry was stored during a previous iteration of steps 422-432 (e.g., during the iteration immediately preceding the current iteration).

At step 428, the retrieved trace entries are added to the live execution trace log. For example, a first one of the identified entries may be stored at the identified address, and each subsequent one of the trace entries may be stored at a subsequent address. In other words, for a set of entries $\{e_0, e_1, \ldots, e_n\}$, each entry $e_x$ may be added to an address (i+x), where n is a positive integer greater than 1, x is positive integer less than or equal to n, and i is the address identified at step 426.

At step 428, the type of collection event (detected at step 424) is determined. If the collection event is a state transition event, which indicates that the computer program is transitioning from the hardware-accelerated state to the hardware emulated state, the process 400C returns to step 412 of the process 400A. Otherwise, if the event is one that indicates that the timer (set at step 422) has expired, the process 400C returns to step 422.

The example of FIGS. 4A-C assumes that a single processor is used to execute the computer program 124. However, alternative implementations are possible in which multiple processors are used to execute the computer program 124. In such implementations, each of the processors may have its own respective hardware logger. Accordingly, before the computer 124 is executed, a separate hardware trace log may be initialized for each of the processors. Afterwards, when a collection event is detected (at step 124), trace entries may be retrieved from each of the hardware trace logs and added to the live execution trace log. Furthermore, in some implementations, the trace collector (or its record-or-verify function) may be configured to generate trace entries in the same format as the hardware logger, which populates the hardware trace log. Doing so may permit a seamless integration, into the live execution trace log, of entries that are retrieved from the hardware trace log and entries that are generated dynamically by the record-or-verify function of the trace collector. In some implementations, two trace entries may have the same format when: (i) they identify the same information, and (ii) encode the information by using the same encoding scheme.

Figure 5:
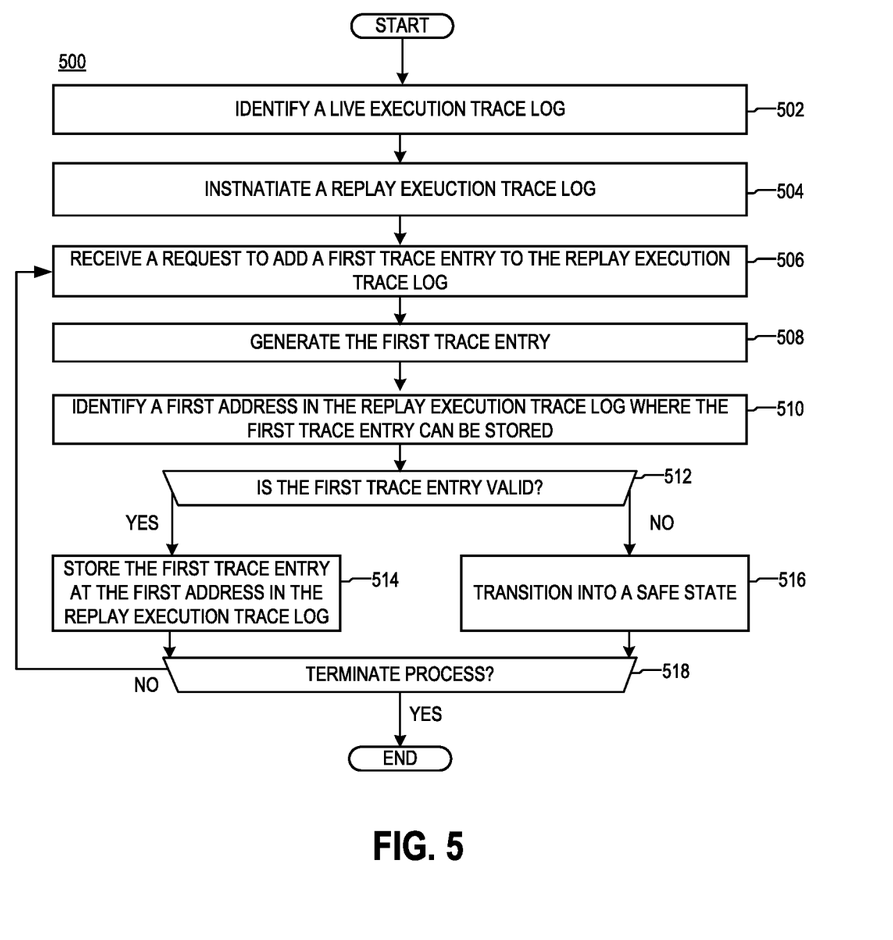
FIG. 5 is a flowchart of an example of a process, according to aspects of the disclosure.

FIG. 5 is a flowchart of an example of a process 500 for generating a replay execution trace log, according to aspects of the disclosure. According to the present example, the process 500 is performed by a trace collector, such as the trace collector 126, which is discussed above with respect to FIG. 3. However, it will be understood that alternative implementations are possible in which the process 500 is performed by another software (or hardware) component of a computing system. Furthermore, it will be understood that at least some of the steps of the process 500 may be performed in a different order or altogether omitted. According to the present example, the process 500 is executed during a replay execution of a computer program. In some implementations, the computer program may be the same or similar to the computer program 124, which is discussed above with respect to FIGS. 1A-3.

At step 502, the trace collector identifies a live execution trace log that is associated with the computer program. The live execution trace log may be one that is generated during a particular live execution of the trace program, which corresponds to the replay execution. According to the present example, a live execution may correspond to a replay execution, if the replay execution is performed based on a replay event log that is generated during the live execution. Additionally, or alternatively, in some implementations, a live execution log may correspond to a replay execution, if the replay execution is performed based on the same set of events as the live execution. Additionally, or alternatively, in some implementations, a live execution log may correspond to a replay execution if the replay execution is performed based on the same set of inputs (e.g., user inputs or another type of inputs) as the live execution. In some implementations, the live execution trace log may be the same or similar to the live execution trace log 128, which is discussed above with respect to FIGS. 1A-3. Additionally, or alternatively, in some implementations, the live execution trace log may be the same or similar to the live execution trace log that is generated as a result of executing processes 400A-C, which are discussed above with respect to FIGS. 4A-C.

At step 504, the trace collector instantiates a replay execution log that is associated with the computer program. Instantiating the replay execution trace log may include instantiating one or more files (or other structures) that are configured to store trace data that is generated during the replay execution of the computer program. In some implementations, the replay execution trace log may be the same or similar to the replay execution trace log 130, which is discussed above with respect to FIGS. 1A-3.

At step 506, the trace collector receives a request to add a first trace entry to the replay execution trace log. At step 508, the trace collector generates the first trace entry in response to the request. At step 510, the trace collector identifies a first address M in the replay execution trace log. As is discussed further below, the first address M is the address in the replay execution log where the first trace entry will be stored if it is determined that the first trace entry matches any of the trace entries in the live execution trace log.

At step 512, the trace collector detects whether the live execution trace log contains a second trace entry that matches the first trace entry. According to aspects of the disclosure, the first trace entry may match the second trace entry when the first trace entry and the second trace entry correspond to the same branch instruction (e.g., when both the first trace entry and the second trace entry are associated with the execution of the same line of code in the computer program). Furthermore, the first trace entry and the second trace entry may match when the second trace entry is located at an address N in the live execution trace log, such that N is equal to M or N is within a predetermined distance from M (i.e., |N−M|<threshold_distance).

In other words, in some implementations, for the first trace entry to match a respective trace entry in the live execution trace log, two conditions may need to be satisfied—namely: (i) the two trace entries have to trace the execution of the same line of code (e.g., both trace entries have to be associated with the instruction located at line X in the computer program), and (ii) the line of code has to be executed at the same (or proximate) point in the execution flow of the computer program during each of the live execution of the computer program and the replay execution of the computer program. As noted above, each of the replay execution log and the live execution trace log may be generated, such that each new trace entry is appended to the end of the trace log. In this regard, the position (e.g., address) of a particular trace entry in a trace log identifies the point (in the execution flow of the computer program) at which the entry's corresponding instruction (e.g., a branch) is executed.

If the live execution trace log contains a second trace entry that matches the first trace entry, the process 500 proceeds to step 514. Otherwise, if the live execution trace log does not contain a second trace entry that matches the first trace entry, the process 500 proceeds to step 516.

At step 514, the trace collector adds the first trace entry to the replay execution log at address M (i.e., the address identified at step 510). At step 516, the trace collector performs a transition into a safe state. Transitioning into the safe state may include taking any action that indicates that the live execution log contains no trace entry that matches that the first trace entry (generated at step 508). In some implementations, transitioning into a safe state may include generating an indication (e.g., a message, an alphanumerical string, etc.) that the first entry does not match any of the entries in the live execution trace log. Additionally, or alternatively, in some implementations, transitioning into a safe state may include outputting an error message. In some implementations, outputting the error may include displaying a message (and/or an image) on a display screen, outputting an audible alert, transmitting an indication of the error over a communications network, and/or storing an indication of the error in a memory and/or in the replay execution trance. Additionally, or alternatively, in some implementations, transitioning into a safe state may include adding the first trace entry to the replay execution trace log along with an indication that the live execution trace log does not contain a match for the first trace entry. Additionally, or alternatively, in some implementations, transitioning into a safe state may include terminating the replay execution of the computer program.

At step 518, a determination is made whether to continue the process 500. If a decision is made to stop executing the process 500, the process 500 is terminated. Otherwise, the process 500 returns to step 506. In some implementations, the process 500 may be terminated when the replay execution of the computer program ends. Additionally, or alternatively, in some implementations, the process 500 may be terminated when a transition into the safe state is performed (e.g., in response to detecting that none of the entries in the live execution trace log matches the first entry, etc.). Additionally, or alternatively, in some implementations, the process 500 may be terminated when a predetermined user input is received.

FIG. 5 provides an example in which replay trace data is logged in a separate log (e.g., a replay execution trace log). However, alternative implementations are possible in which the replay trace data is not logged in a separate log after it has been compared to a corresponding live execution trace log. In such implementations, if a generated trace entry is found to be valid (e.g., see step 512, etc.), the trace entry may be discarded, and the replay execution of the computer program is continued. However, if the generated trace entry is found to be invalid, the trace collector may transition into a safe state (e.g., terminate the execution of the computer program, etc.). Furthermore, as noted above, for the first trace entry to match a respective trace entry in the live execution trace log, (i) the two trace entries have to trace the execution of the same line of code (e.g., instruction, etc.) and (ii) the line of code has to be executed at the same (or proximate) point in the execution flow of the computer program during each of the live execution of the computer program and the replay execution of the computer program. In some implementations, the line of code may be considered to be executed at the same (or proximate) point in the execution flow of the computer program during each of the live execution and the replay execution of the computer program, if: (i) the line of code is the N-th line of code of the computer program to be executed during the live execution of the computer program, and (ii) the line of code is the M-th line of code of the computer program to be executed during the replay execution of the computer program, such that N is equal to M or N is within a predetermined distance from M.

According to aspects of the disclosure, the process discussed with respect to FIGS. 4A-C may be used to generate a live execution trace log of a computer program. The process discussed with respect to FIG. 5 may be used to generate a replay execution trace log of the computer program. The live execution trace log may be generated during a live execution of the computer program. The replay execution trace log may be generated during a replay of the live execution. As noted above, the live execution of the computer program may be performed by using an emulator, along with hardware acceleration. By contrast, the replay execution may be performed by using the emulator, with the hardware acceleration disabled. As a result of this arrangement, during live execution, a portion of the computer program may be executed directly by a processor (without the involvement of the emulator), whereas during replay execution, the same portion of the computer program may be executed by the emulator (e.g., with the emulator serving as an interface for accessing the processor, etc.).

The implementation of the emulator may result in discrepancies between the live execution trace log and the replay trace log. Although the emulator can be designed to provide a faithful abstraction of the processor, subtle differences between the operation of the processor and emulator may still exist. Such differences may relate to the way in which interrupts are handled and/or the way in which various system timers are decremented, and they may result in the computer program having different execution flows during the live execution and the replay execution. Any differences in the execution flow of the computer program (during the live execution and the replay execution) may cause a particular line of code to be registered at a different position in the replay execution trace log than in the live execution trace log, resulting in a discrepancy between the live execution trace log and the replay execution trace log.

The live execution trace log and the replay execution trace log may be used to debug the computer program. Discrepancies between the live execution trace log and the replay execution trace log may be either: (i) a product of bugs that are present in the computer program or (ii) a product of the implementation of the emulator. Discrepancies that are the product of bugs can be used to track down the bugs and correct them. Discrepancies resulting from the implementation of the emulator, on the other hand, may be benign in their nature and have no value with respect to debugging the computer program.

Mistaking a discrepancy resulting from the implementation of the emulator for a discrepancy that is caused by a software bug can be costly. It can cause numerous man-hours to be spent investigating the discrepancy only to find out that no bugs are present that have caused the discrepancy. In this regard, executing the processes 400A-500 may help validate the replay execution trace log, while the replay execution log is being generated, and ideally ensure that no discrepancies exist between the live execution trace log and the replay execution trace log, which are caused by the implementation of the emulator, rather than bugs.

FIGS. 1A-5 are provided as an example only. At least some of the steps discussed with respect to FIGS. 1A-5 may be performed in parallel, in a different order, or altogether omitted. As used in this application, the word "exemplary" is used herein to mean serving as an example, instance, or illustration.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   generating a live execution trace log corresponding to a live execution of a computer program, the live execution being performed by using both hardware emulation and hardware acceleration;
   generating a first trace entry corresponding to a replay execution of the computer program, the replay execution being performed by using hardware emulation without hardware acceleration, the replay execution being performed based on a set of events that are recorded during the live execution of the computer program;
   detecting whether the first trace entry is valid based on the live execution trace log, wherein detecting whether the first trace entry is valid includes detecting whether the live execution trace log includes a second trace entry that matches the first trace entry; and
   in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

2. The method of claim 1, further comprising, in response to detecting that the first trace entry is valid, adding the first trace entry to a replay execution trace log.

3. The method of claim 1, further comprising, in response to detecting that the first trace entry is valid, discarding the first trace entry.

4. The method of claim 1, wherein generating the live execution trace log includes:
   during periods in which hardware acceleration is used to execute the computer program, retrieving hardware trace entries from a hardware trace log and adding the hardware trace entries to the live execution trace log;
   during periods in which hardware emulation is used to execute the computer program, generating new trace entries in response to respective requests from a hardware emulator, and adding the new trace entries to the live execution trace log.

5. The method of claim 1, wherein generating the live execution trace log includes:
   detecting a first state transition of the computer program from a hardware-emulated state to a hardware-accelerated state;
   in response to the first state transition, periodically retrieving hardware trace entries from a hardware trace log and adding the hardware trace entries to the live execution trace log, the hardware trace entries being periodically retrieved from the hardware trace log and added to the live execution trace log until the computer program transitions back into the hardware-emulated state.

6. The method of claim 1, wherein the second trace entry matches the first trace entry when: (i) the first trace entry and the second trace entry are associated with a same instruction of the computer program, and (ii) the instruction is executed at the same or proximate point in an execution flow of the computer program during each of the live execution of the computer program and the replay execution of the computer program.

7. A system, comprising:
   a memory; and
   at least one processor, configured to perform operations of:
   generating a live execution trace log corresponding to a live execution of a computer program, the live execution being performed by using both hardware emulation and hardware acceleration;
   generating a first trace entry corresponding to a replay execution of the computer program, the replay execution being performed by using hardware emulation without hardware acceleration, the replay execution being performed based on a set of events that are recorded during the live execution of the computer program;
   detecting whether the first trace entry is valid based on the live execution trace log, wherein detecting whether the first trace entry is valid includes detecting whether the live execution trace log includes a second trace entry that matches the first trace entry; and
   in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

8. The system of claim 7, wherein the at least one processor is further configured to perform the operation of adding the first trace entry to a replay execution trace log in response to detecting that the first trace entry is valid.

9. The system of claim 7, wherein the at least one processor is further configured to perform the operation of discarding the first trace entry in response to detecting that the first trace entry is valid.

10. The system of claim 7, wherein generating the live execution trace log includes:
during periods in which hardware acceleration is used to execute the computer program, retrieving hardware trace entries from a hardware trace log and adding the hardware trace entries to the live execution trace log;
during periods in which hardware emulation is used to execute the computer program, generating new trace entries in response to respective requests from a hardware emulator, and adding the new trace entries to the live execution trace log.

11. The system of claim 7, wherein generating the live execution trace log includes:
detecting a first state transition of the computer program from a hardware-emulated state to a hardware-accelerated state;
in response to the first state transition, periodically retrieving hardware trace entries from a hardware trace log and adding the hardware trace entries to the live execution trace log, the hardware trace entries being periodically retrieved from the hardware trace log and added to the live execution trace log until the computer program transitions back into the hardware-emulated state.

12. The system of claim 7, wherein the second trace entry matches the first trace entry when: (i) the first trace entry and the second trace entry are associated with a same instruction of the computer program, and (ii) the instruction is executed at the same or proximate point in an execution flow of the computer program during each of the live execution of the computer program and the replay execution of the computer program.

13. A non-transitory computer-readable medium storing processor executable instructions, which when executed by at least one processor cause the at least one processor to perform the operations of:
generating a live execution trace log corresponding to a live execution of a computer program, the live execution being performed by using both hardware emulation and hardware acceleration;
generating a first trace entry corresponding to a replay execution of the computer program, the replay execution being performed by using hardware emulation without hardware acceleration, the replay execution being performed based on a set of events that are recorded during the live execution of the computer program;
detecting whether the first trace entry is valid based on the live execution trace log, wherein detecting whether the first trace entry is valid includes detecting whether the live execution trace log includes a second trace entry that matches the first trace entry; and
in response to detecting that the first trace entry is not valid, transitioning into a safe state, wherein transitioning into the safe state includes one or more of: (i) generating an indication that the first trace entry is invalid, (ii) outputting the indication on an output device, and (iii) terminating the replay execution of the computer program.

14. The non-transitory computer-readable medium of claim 13, wherein the processor-executable instructions further cause the at least one processor to perform the operation of adding the first trace entry to a replay execution trace log in response to detecting that the first trace entry is valid.

15. The non-transitory computer-readable medium of claim 13, wherein the processor-executable instructions further cause the at least one processor to perform the operation of discarding the first trace entry in response to detecting that the first trace entry is valid.

16. The non-transitory computer-readable medium of claim 13, wherein generating the live execution trace log includes:
during periods in which hardware acceleration is used to execute the computer program, retrieving hardware trace entries from a hardware trace log and adding the hardware trace entries to the live execution trace log;
during periods in which hardware emulation is used to execute the computer program, generating new trace entries in response to respective requests from a hardware emulator, and adding the new trace entries to the live execution trace log.

17. The non-transitory computer-readable medium of claim 13, wherein generating the live execution trace log includes:
detecting a first state transition of the computer program from a hardware-emulated state to a hardware-accelerated state;
in response to the first state transition, periodically retrieving hardware trace entries from a hardware trace log and adding the hardware trace entries to the live execution trace log, the hardware trace entries being periodically retrieved from the hardware trace log and added to the live execution trace log until the computer program transitions back into the hardware-emulated state.

18. The non-transitory computer-readable medium of claim 13, wherein
the second trace entry matches the first trace entry when: (i) the first trace entry and the second trace entry are associated with a same instruction of the computer program, and (ii) the instruction is executed at the same or proximate point in an execution flow of the computer program during each of the live execution of the computer program and the replay execution of the computer program.

* * * * *